Feb. 4, 1958  J. C. STEINMETZ ET AL  2,822,207
RELEASE EJECTOR
Filed Nov. 20, 1953  3 Sheets-Sheet 1

INVENTORS
JOHN C. STEINMETZ
DANIEL E. HOLLOWAY
BY
William L. Lane
ATTORNEY

INVENTORS
JOHN C. STEINMETZ
DANIEL E. HOLLOWAY

ATTORNEY

INVENTORS
JOHN C. STEINMETZ
DANIEL E. HOLLOWAY
BY
William R. Lane
ATTORNEY

United States Patent Office 2,822,207
Patented Feb. 4, 1958

2,822,207

RELEASE EJECTOR

John C. Steinmetz, Anaheim, and Daniel E. Holloway, Manhattan Beach, Calif., assignors to North American Aviation, Inc.

Application November 20, 1953, Serial No. 393,406

4 Claims. (Cl. 294—83)

This invention pertains to a suspension and release device and more particularly to a device for carrying a store such as a tank, bomb or the like on a vehicle such as an aircraft, and provided with means for positively ejecting the store from the suspension device.

The need for a workable suspension and release device which will positively eject a store carried by an aircraft has become increasingly critical. When a tank or a bomb is released from a modern high performance aircraft the aerodynamic loads on this store may cause it to violently strike the aircraft structure before dropping away from the aircraft. This is true even for bomber-type aircraft which are provided with a bomb bay for internally carrying bombs, because when the bomb bay is opened for release of the bombs problems from aerodynamic loads are encountered. It has also been difficult to successfully drop a store during many types of maneuvers because by reason of the maneuvers the stores would not move sufficiently far away from the aircraft to avoid striking portions of its structure. In addition to the effects from aerodynamic loads, under negative "g" conditions the aircraft may be accelerating in such a manner that the store will not drop away therefrom when released in the usual manner. Nevertheless, it may be essential that the store be removed from the aircraft despite such adverse conditions. As far as externally carried fuel tanks are concerned, it has been customary to provide these objects with fins so that when they are released from the aircraft the fins will direct these stores away from the aircraft structure. This naturally adds to the cost of construction and to the weight of the tank, and is not adequate in all cases for preventing the tank from being driven against the aircraft.

It has been proposed in the past to provide a power-operated ejector for use in conjunction with the suspension and release mechanism to forcibly urge the store away from the aircraft to avoid the above discussed difficulties. With the normal design of this type the suspension mechanism holds the store at the location of its mounting lugs and an ejector member engages the store at a position intermediate of the lugs. The ejector member may be driven by a suitable source of power such as a cartridge. Upon detonation of the cartridge it is intended that the ejector member will forcibly remove the store from the aircraft. Such a design has certain shortcomings. For one thing, the store itself must be reinforced at the location where it is engaged by the ejector member in order that it will withstand the forces exerted by the ejector in urging it away from the aircraft. Weight and cost are accordingly increased. The ejector member will normally engage the store at a location remote from its center of gravity. Therefore the ejecting force will exert a moment tending to rotate the store, which may cause it to violently strike the aircraft. Furthermore, with these designs an inadequate force has been produced by the cartridge to eject the store a sufficient distance to preclude its striking the aircraft.

Accordingly, it is an object of this invention to provide a means for releasably suspending a store and positively ejecting the same.

Another object of this invention is to provide a suspension and release device having an ejector with a capacity to exert sufficient force to eject the store under all flight conditions.

A further object of this invention is to provide a suspension and release device including an ejection means whereby there is no requirement for reinforcement of a store carried.

Yet another object of this invention is to provide a suspension and release device having a positive ejector whereby the requirement for fins or other guide means on the store is eliminated.

An additional object of this invention is to provide a suspension and release device whereby the ejecting force will not tend to rotate the store.

These and other objects will become apparent from the following detailed description taken in connection with the accompanying drawing, in which.

Figure 1:
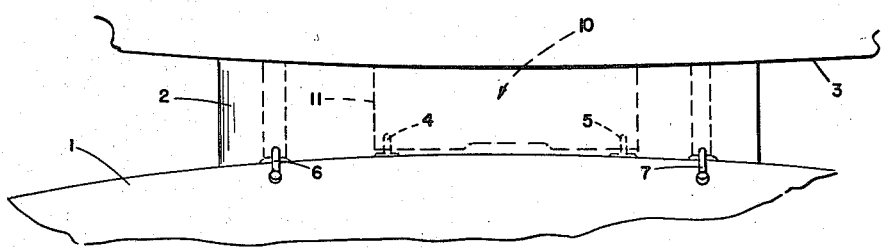
Fig. 1 is a side elevational view of a store attached to an aircraft.

Referring to Fig. 1 of the drawing, it may be desired to hold a store such as tank 1 adjacent a pylon 2 which is secured to a portion of an aircraft structure 3. Rather than a tank, the store might be a bomb or other object, and it could be carried inside the aircraft instead of exteriorly as shown. Such a store will be provided with spaced lugs 4 and 5 which are adapted to be engaged by some holding device so that the store can be suspended from an airplane. The store will have a certain amount of reinforcing at the locations of these lugs so that it can withstand the loads upon it when it is suspended. With the suspension and release device of this invention no additional reinforced areas need be provided, even though the store is forcibly removed from the device when released. Sway braces 6 and 7, which brace but do not suspend the tank, may also be provided with the pylon assembly.

Figure 2:
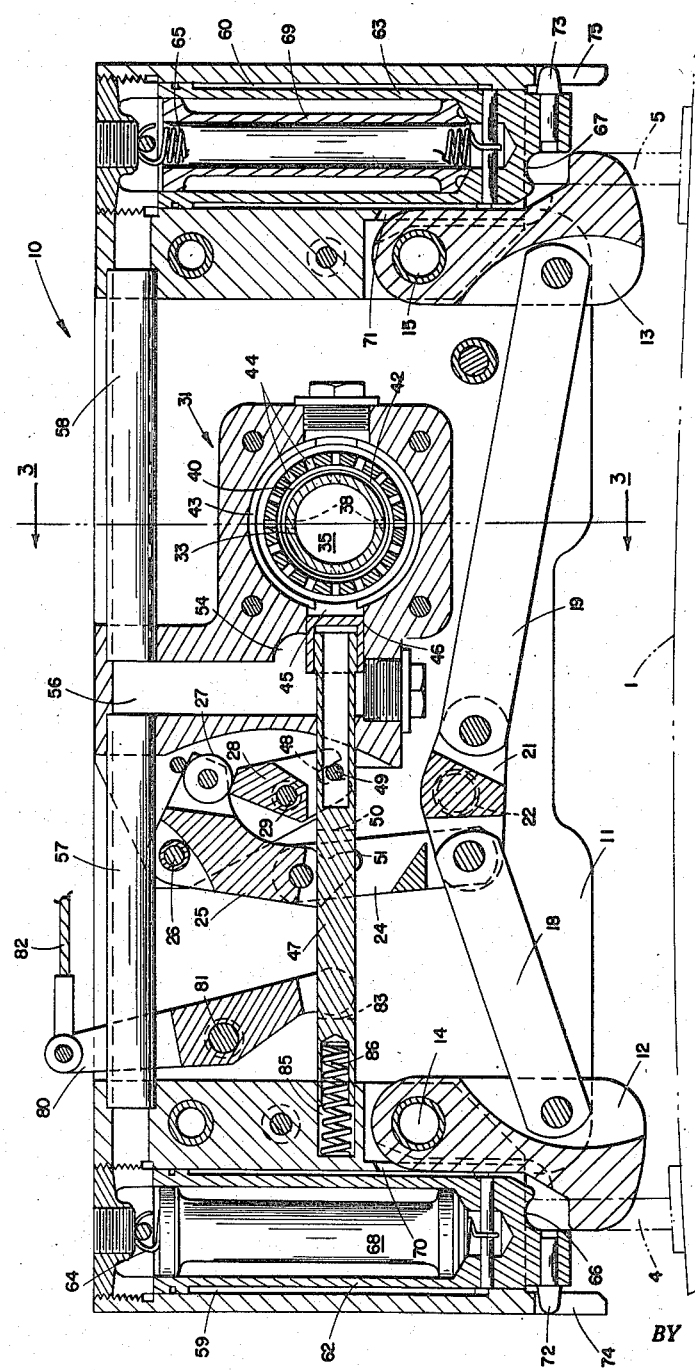
Fig. 2 is a side elevation, partially in section, of the suspension and release device in position for holding a store.

Suspension and release device 10 of this invention is secured to pylon 2 and may be dimensioned to fit within the streamlined fairing defining the surface thereof. As shown in Fig. 2, the device 10 includes a support portion or housing 11 which rigidly secures it to the pylon. Hooks 12 and 13 are pivotally connected to support 11 at opposite points 14 and 15. These hooks are adapted to engage tank support lugs 4 and 5, respectively, when the hooks are in their extended position as shown in Fig. 2 in holding the tank to the pylon. A toggle link 18 projects from hook 12 while a second toggle link 19 extends from hook 13. These toggles are in turn connected with a crank 21 which is pivotally secured at 22 to support structure 11. Arm 24 extends from crank 21 and pivotally engages a second crank 25, pivotally secured to the structure at 26. One end of crank 25 carries a roller 27 which, when the device is in position to hold a store, engages release rocker 28 pivoted to the structure at 29. It can be seen thus far that a downward load on hook 12 will tend to pivot this hook about point 14 so as to push on toggle link 18. This force on link 18 will be on a line which would extend above pivot point 22 of crank 21. At the same time, the downward load on hook 13 pushes link 19 on a line projecting below point 22. These forces, therefore, tend to rotate crank 21 in a clockwise direction which would pivot the hooks so as to break toggle linkage 18—19. Such forces, however, are resisted by arm 24 and crank 25 because of the engagement of the latter with release rocker 28. This rocker, therefore, maintains the toggle linkage in the position shown in Fig. 2 with the hook members in engagement with support portions of the store.

Figure 3:
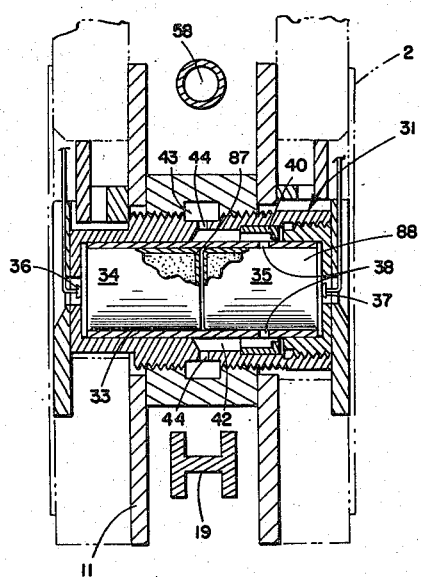
Fig. 3 is a sectional view taken along line 3—3 of Fig. 2.

Also included with the suspension and release device of this invention for providing an operating force, is a breech assembly 31 carried by support 11. In the preferred embodiment the breech assembly includes cartridge chamber 33 which is adapted to hold two explosive charges 34 and 35, as best seen in the sectional view of Fig. 3. Detonator electrical contacts 36 and 37 communicate with these two portions of the cartridge chamber, respectively. The detonator circuit (not shown) is conventional, both detonators being connected to a single switch. The wall of chamber 33 is provided with a plurality of restricted exhaust apertures 38 which serve to transmit the gases from the chamber following an explosion therein. These restricted openings also enable complete and adequate burning of the explosive charge, as will be more fully explained hereinafter. Immediately opposite apertures 38 is disposed a ring 40 which is constructed of a suitable material for withstanding the erosive effects of the exhaust gases rushing from openings 38. Because this element is the portion of the breech assembly which may be subjected to the most wear or deterioration it is preferably made replaceable, as an element separate from the rest of the breech assembly. The provision of two portions in the cartridge chamber with separate detonator circuits enables the use of two cartridges for obtaining added force in operating the linkage and ejecting the store, as will be more fully explained below. An additional safety feature results, because both detonator circuits are triggered at once, and if one of these should fail to operate for any reason the other will explode its cartridge which will in turn explode the first cartridge.

After the gases have encountered annular ring 40 they are conducted through passageway 42 to a collector ring 43. Several small openings 44 connect passageway 42 and the collector ring. These apertures are sufficiently numerous to offer no appreciable restriction to the flow of the gases, but serve to reject any large pieces of material produced by the detonation of the cartridges. The collector ring 43 opens into a cylinder 45 (see Fig. 2). Disposed within cylinder 45 is a piston 46 which connects with an elongated rod 47. Owing to this construction, when the exhaust gases from the cartridge chamber enter the cylinder 45 they react against the head of piston 46 urging the piston through a stroke to the left from the position illustrated in Fig. 2, to the location of Fig. 4. Rod 47, of course, moves to the left with piston 45.

Release rocker 28 has a slotted lower portion 48 which engages a pin 49 carried by rod 47. When the piston and rod assembly is moved to the left as a result of an explosion within the cartridge chamber, pin 49 will cause rotation of release rocker 28 about point 29, moving the release rocker to the position shown in Fig. 4. When the release rocker is so rotated it disengages roller 27 thereby unlocking the linkage, freeing crank 25 for rotation. The downward thrust of the store on hooks 12 and 13 is then able to break the toggle linkage 18—29. Accordingly, it will cause clockwise rotation of crank 21 which can now rotate due to the movement of release rocker 28 in disengaging roller 27. With a relatively small force, then, the toggle linkage is broken permitting hooks 12 and 13 to rotate to the released position shown in Fig. 4 so that the tank-support lugs are no longer held by the hooks and the store is free to drop from the aircraft.

If, for some reason, due to aerodynamic loads or other factor, the weight of the store fails to break the toggle linkage and release the hook members, the device includes a positive means for so moving the toggle links and rotating the hook members. For effecting this, rod 47 is provided with a shoulder 50 which can best be seen in Fig. 4. As rod 47 moves to the left in response to the force on the piston 46, shoulder 50 will engage projecting tip 51 of crank 25 and, therefore, will forcibly rotate crank 25 clockwise about pin 26. This will, in turn, by means of arm 24, rotate crank 21 clockwise about pin 22 and break the toggle linkage so that the hooks are moved to a released position.

The foregoing provisions will satisfactorily release a store from the aircraft, but will have no effect in ejecting it so that it will be sure to fall free of the aircraft and not strike any portions thereof. Additional features are included to give a positive ejecting force to the store. For this reason cylinder 45 includes a port 54 which is normally closed by piston 46 when the piston is at the right end of its stroke as shown in Fig. 2. However, when the piston moves to the left in response to the gases thereagainst resulting from the explosion in the cartridge chamber, port 54 is opened so that the explosive gases are free to enter passageway 56. The gas flow then divides into passageways 57 and 58 so that substantially equal portions are conducted to ejector cylinders 59 and 60. Within these ejector cylinders are piston members 62 and 63, normally held at the top ends of the cylinders by means of springs 64 and 65. Plugs 68 and 69 are fitted within the two pistons to displace a large portion of the volume of the interiors of the pistons. The explosive gases within the two ejector cylinders force pistons 62 and 63 simultaneously downwardly relative to the ejector cylinders. The bottom portions of these ejector pistons have rounded sections 66 and 67 which are normally in engagement with or closely adjacent tank-support lugs 4 and 5. Therefore, when the ejector pistons 62 and 63 are moved downwardly by the explosive gases they engage tank-support lugs 4 and 5 and force the tank downwardly away from the pylon. These pistons continue through a relatively long stroke to the position shown in Fig. 4, thereby effectively driving the store clear of the aircraft so that there will be no tendency for the store to strike and damage any portion of the aircraft structure. The force is exerted at two spaced locations so that the store is given a balanced impetus so that it will not tumble or rotate about its center of gravity. It should be observed that this force against the store is at the location of the tank-support portions where the store has already been reinforced. This means that the store is able to withstand the forces exerted thereagainst so that the store will be ejected effectively and not merely dented in and insufficiently driven away from the aircraft. Therefore the store supports 4 and 5 are made to perform a dual function.

Port 54 in cylinder 45 is opened only after piston 46 has moved to the left. This means that the release linkage has been shifted to an unlocked position and the hooks have released the store. Therefore, the ejecting force cannot be exerted until the store has been released and the passageway to the ejector cylinder is subsequently opened. Of course this action is very rapid, but proper sequencing is important.

It is very important in successfully ejecting a store under all conditions that an adequate force be transmitted from pistons 62 and 63 to the store. The store must be driven away from the aircraft with sufficient velocity so that it will be impossible for it to strike the aircraft when the aerodynamic loads thereon eventually cause the store to tumble. Such an ejecting force can be obtained only if there is practically complete burning of the explosive charge. It is for this purpose that the exit from explosion chamber 33 is only through restricted openings 38. This means that after the explosion is set off it will be to some extent confined within chamber 33, rather than all of the gases produced thereby immediately passing into cylinder 45. With the burning so retained within chamber 33 a much higher proportion of the charge will burn and a maximum force from the explosive gases will be obtained. The exact number and size of apertures 38 will depend upon the particular object to be ejected.

Additional confinement of the gases results from the construction of explosive cartridges 34 and 35. The exteriors of these cartridges comprise metal jackets 87 and 88, respectively, which must be ruptured before the explosive gases can escape therefrom. The cartridge cases, therefore, act as bursting diaphragms, also serving to confine the explosion to a degree for assuring complete burning. Naturally the greater the thickness of cartridge cases 87 and 88 the more the gases will be confined. For any particular design the restriction from the cartridge cases should be balanced with that from apertures 38 so that optimum burning will take place.

In other respects cartridges 34 and 35 may be of conventional design being in general of the type of cartridge used for engine starters or the like.

Figures 4, 5:
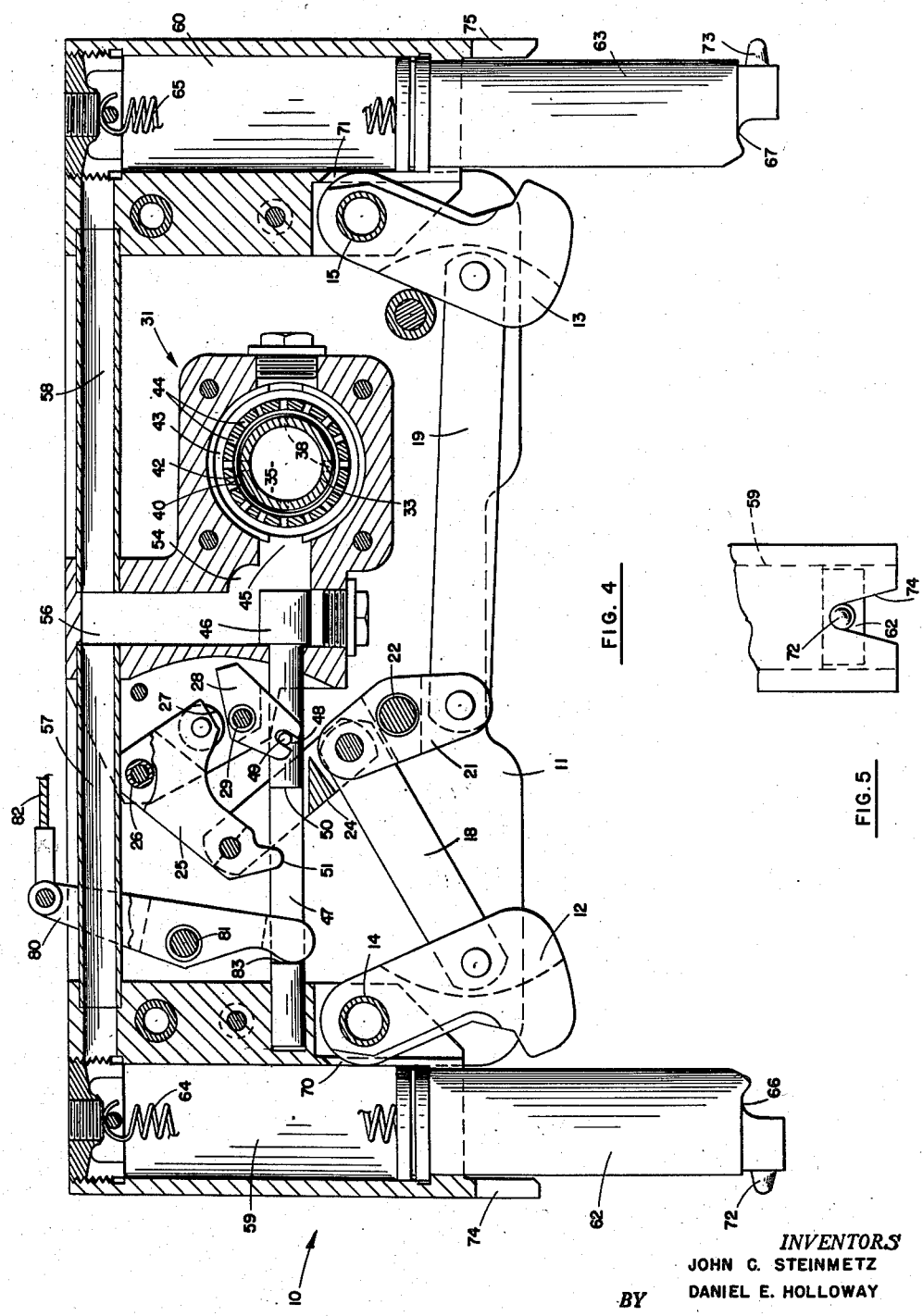
Fig. 4 is a side elevation, partially in section, of the device in released position.
Fig. 5 is a fragmentary view illustrating the centering pins.

Cylinders 59 and 60 have exhaust ports 70 and 71, respectively, which are opened as the ejector pistons are moved downwardly so that as the pistons achieve the bottom portion of the stroke the explosive gases will be permitted to escape from the ejector unit. When the store has been ejected and driven away from the aircraft by the ejector unit, springs 64 and 65 will retrieve pistons 62 and 63 so that each is again drawn to the top position of its cylinder. The pistons include centering studs 72 and 73 adapted to engage grooves 74 and 75, respectively, in the cylinder walls. Therefore, when the pistons are drawn back within the ejector cylinders they will be centered relative thereto and will be in proper position for again engaging tank support lugs. The fragmentary showing of Fig. 5 illustrates the action of pin 72.

As an additional factor for purposes of safety, and also for convenience under certain conditions as when the unit is on the ground, a manual release lever arrangement is provided. The manual release includes a crank member 80 pivoted to structure 11 at 81. The top end of crank 80 fastens to a suitable actuator system 82 and passes to the pilot's compartment so the pilot may, by pulling on the cable, rotate the crank 80 in a clockwise direction. The opposite end of member 80 is adapted to engage a shoulder 83 of rod 47 which will move the rod through its stroke to the left and break the toggle linkage exactly as was described for the release from the explosive charge.

The end of rod 47 remote from piston head 46 slides within portion 85 of the housing and is engaged by a spring 86. This spring urges the rod to the right so that resetting of the device and positioning of the linkage is facilitated.

Figure 6:
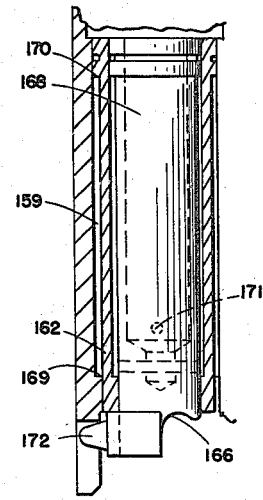
Fig. 6 is a fragmentary view of a modified telescoping ejector piston in retracted position.
Figure 7:
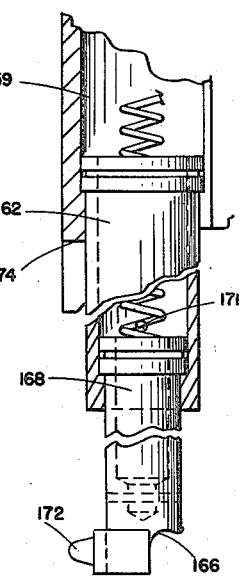
Fig. 7 is a fragmentary view of the telescoping piston in extended position.

In order to obtain a greater thrust output from the ejector pistons, the ejector piston assemblies may be modified as illustrated in Figs. 6 and 7. As shown in these figures, the ejector pistons are of a telescoping type whereby the piston stroke will be about twice as long as with the previously described embodiment. Thus within ejector cylinder 159 there is disposed an outer piston 162 which contains an inner piston 168. Therefore, when the exhaust gases enter cylinder 159, outer piston 162 will be driven downwardly into engagement with shoulder 169 of the cylinder, while inner piston 168 will be driven downwardly into engagement with shoulder 170 of the outer piston. A full stroke is obtained from both of the inner and the outer ejector pistons. It is preferred with this embodiment, in obtaining the maximum piston stroke, to provide an outlet port 171 near the lower portion of outer piston 162 rather than the type in the previously described embodiment which is within the cylinder wall itself. The bottom of inner piston 168 includes a portion 166 adapted for engagement with the tank support lug, and centering pin 172, which act as do the corresponding portions on the previously described ejector pistons. In addition, there is provided a shoulder 174 which is engaged by the bottom of outer piston 162 when the two pistons are in the raised position. This shoulder assures that the outer piston cannot be driven downwardly prior to downward movement of the inner piston. In other words, as soon as the ejector pistons begin to move, the ejecting force will be exerted against the store support lugs.

Although described and illustrated as used with an aircraft, and particularly adapted for such purposes, this invention can be successfully used wherever it is desired to suspend, release and eject an object.

The foregoing detailed description is to be clearly understood as given by way of illustration and example, the spirit and scope of this invention being limited only by the appended claims.

We claim:

1. A suspension and release device for a store having a plurality of attaching portions, said device comprising a breech member adapted to receive a cartridge member therein; cylinder means connected with said breech member for receiving gases from an explosion in said breech member; piston means in said cylinder movable in response to pressure from said gases; releasable retaining means engaging said store at each of said attaching portions, said retaining means being interconnected with said piston means and operable thereby, whereby said movement of said piston means moves said retaining means to a released position for releasing said store; passage means connected with said cylinder and opened by said movement of said piston means; an ejection cylinder adjacent each of said retaining means, each ejection cylinder being connected with said passage means; an ejector piston in each of said ejection cylinders whereby said ejection cylinders receive said gases from said explosion in said breech and said ejector pistons are urged against said store at each of said attaching portions for thereby forcibly ejecting said store from said device.

2. A suspension and release device for a store having a plurality of support portions, said device comprising a retractable and extensible retaining member for each of said support portions, each retaining member being adapted when extended to engage a support portion whereby said retaining members support said store; an operating linkage interconnecting said retaining members for effecting simultaneously operation thereof; piston means connected with said linkage whereby movement of said piston means through a stroke in one direction effects operation of said linkage to retract said retaining members; cylinder means for reciprocally receiving said piston; explosion chamber means adapted to receive an explosive charge, said chamber being connected with said cylinder means whereby gases produced by the explosion of such a charge enter said cylinder means and react against said piston means for moving said piston means through said stroke thereby to retract said retaining members and release said store; an ejector cylinder disposed adjacent each of said retaining members; passage means interconnecting said ejector cylinders and said firstly mentioned cylinder, said firstly mentioned cylinder having port means therein providing communication with said passage means, said port means being disposed whereby said firstly mentioned piston means normally closes said port yet opens said port on said movement thereof, whereby said explosive gases are transmitted through said passage means to said ejector cylinders for engaging said ejector piston means and urging the same against said store at the location of each of said support portions for forcing said store away from said device.

3. A suspension and release device for a store having at least two support portions, said device comprising a breech, said breech having a chamber for receiving an explosive charge and having restricted aperture means therethrough whereby an explosion of said charge is confined within said chamber and gases produced thereby escape through said aperture means; cylinder means interconnected with said breech for receiving said gases; piston means in said cylinder means responsive to pressure from said gases for movement thereof; a releasable store support linkage adapted to engage and support said store at each of said support portions, said linkage being operatively connected with said piston whereby said movement of said piston releases said store; said cylinder having port means therein normally closed by said piston yet opened upon such movement of said piston; an ejector cylinder adjacent each of said support portions when said store is engaged by said linkage; an ejector piston in each of said ejector cylinders; passage means interconnecting said port and said ejector cylinders whereby when said port is opened said explosive gases pass through said passage means to said ejector cylinders for thereby urging said ejector pistons against said store at the location of each of said support portions for forcibly ejecting said store from said device.

4. A suspension and release device for a store adapted to be carried by an aircraft, said device comprising stationary support means adapted for attachment to an aircraft; a pair of hook members pivotally carried by said support means whereby said hooks are adapted to assume a load-carrying position for engaging and supporting said store; an actuating linkage connected with said hook members and operable to effect simultaneous movement thereof for thereby releasing said store; cylinder means associated with said support means; piston means in said cylinder means; explosion chamber means connected with said cylinder means; explosive cartridge means in said chamber whereby gases produced by explosion thereof move said piston in said cylinder thereby operating said linkage for releasing said store, said cylinder means having port means therein opened only upon such movement of said piston; a pair of ejection cylinders carried by said support member; an ejection piston in each of said ejection cylinders whereby one end of each ejection piston is adjacent a hook member; passage means interconnecting said port means and said ejection cylinders whereby said gases subsequently engage said ejection pistons for thereby urging said ends of said pistons against said store at the location of said hook members, thereby forcibly ejecting said store from said airplane.

References Cited in the file of this patent
UNITED STATES PATENTS

| | | |
|---|---|---|
| 1,946,185 | Bazley | Feb. 6, 1934 |
| 2,206,777 | Kee | July 2, 1940 |
| 2,447,941 | Imber et al. | Aug. 24, 1948 |
| 2,466,980 | Bronson | Apr. 12, 1949 |
| 2,549,785 | Douglass | Apr. 24, 1951 |
| 2,699,908 | Fletcher | Jan. 18, 1955 |
| 2,736,522 | Wilson | Feb. 28, 1956 |